United States Patent [19]

Samii et al.

[11] Patent Number: 5,618,642
[45] Date of Patent: Apr. 8, 1997

[54] BATTERY SEPARATOR WITH SODIUM SULFATE

[75] Inventors: Abbas Samii, Belmont; Wai M. Choi, West Newton, both of Mass.

[73] Assignee: Daramic, Inc., Cambridge, Mass.

[21] Appl. No.: 466,097

[22] Filed: Jun. 6, 1995

[51] Int. Cl.⁶ .................................................. H01M 2/16
[52] U.S. Cl. ........................ 429/247; 429/248; 429/249; 29/623.5
[58] Field of Search .................................. 429/247, 248, 429/249; 29/623.5

[56] References Cited

U.S. PATENT DOCUMENTS

| | | | |
|---|---|---|---|
| 3,351,495 | 11/1967 | Laresen et al. | 136/146 |
| 3,558,762 | 6/1969 | Isaacson et al. | 264/210 |
| 3,679,538 | 10/1970 | Druin et al. | 161/159 |
| 3,853,601 | 12/1974 | Taskier | 117/98 |
| 4,024,323 | 5/1977 | Versteegh | 429/249 |
| 5,336,275 | 8/1994 | Zguris et al. | 29/623.5 |
| 5,468,572 | 11/1995 | Zguris et al. | 429/247 |
| 5,478,677 | 12/1995 | Choi et al. | 429/249 |

FOREIGN PATENT DOCUMENTS 3626096  9/1994  Germany .

Primary Examiner—Stephen Kalafut
Assistant Examiner—Jonathan S. Krueger
Attorney, Agent, or Firm—Nields & Lemack

[57] ABSTRACT

A battery separator having sodium sulfate incorporated therein in order to reduce and/or eliminate hydration short problems in batteries. The preferred method of adding sodium sulfate directly to the separator is via the use of sodium sulfate-containing silica as a separator filler added during the process of manufacturing the separator. The present invention is also directed to a battery separator containing a relatively high level of sodium sulfate, and to batteries which incorporate such separators.

15 Claims, No Drawings

BATTERY SEPARATOR WITH SODIUM SULFATE

BACKGROUND OF THE INVENTION

The present invention is directed to battery separators that incorporate sodium sulfate to reduce hydration shorts.

Storage batteries are generally composed of at least one pair of electrodes of opposite polarity, usually a series of adjacent electrodes of alternating polarity, and an electrolyte. The current flow between these electrodes is maintained by an electrolyte which may be acid, alkaline, or substantially neutral, depending upon the nature of the battery system. Separators are positioned in batteries between adjacent electrodes of opposite polarity to prevent direct contact between the oppositely charged electrode plates while freely permitting electrolyte movement and ionic transfer. Separator components have taken many forms. In modern battery design, the separator is in the form of a sheet or film or more preferably, a thin envelope surrounding each electrode plate of one polarity.

One of the critical elements in a battery design is the separator component, which should have a combination of properties. The battery separator must be resistant to degradation and instability with respect to the battery environment, including the other battery components and the battery chemistry. Thus, the battery separator must be capable of withstanding degradation of strong acids (such as sulfuric acid commonly used in acid battery designs) or strong alkali (such as potassium hydroxide commonly used in alkaline battery designs) and to do so under ambient and elevated temperature conditions. Further, the separator should be of highly porous character to provide a battery of high energy density. Although battery separators of thick or heavy design have been utilized in the past, such materials detract from the overall energy density of the battery by reducing the amount of electrodes and/or electrolyte that can be contained in a predetermined battery configuration and size. Another criterium is that the battery separator must be capable of allowing a high degree of electrolyte movement. Stated differently, an effective separator membrane must exhibit a low electrical resistance when in the battery. The lower the electrical resistance, the better the overall battery performance will be. A still further criterium is that the separator should be capable of inhibiting formation and growth of dendrites. Such dendrite formation occurs during battery operation when part of the electrode material becomes dissolved in the electrolyte and, while passing through the separator, deposits therein to develop a formation which can, after a period of time, bridge the thickness of the separator membrane and cause shorting between electrodes of opposite polarity.

Various microporous membranes or sheet materials have been suggested for utilization as a battery separator. Separators conventionally used in present battery systems are formed of polymeric films which when placed in an electrolyte or an electrolyte system, are capable of exhibiting a high degree of conductivity while being stable to the environment presented by the battery system. The films include macroporous as well as microporous materials. The porosity permits transportation of the electrolyte. Examples of such separators include polyolefin sheets which have been stretched and annealed to provide microporosity to the sheet, such as is described in U.S. Pat. Nos. 3,558,764, 3,679,538 and 3,853,601. U.S. Pat. No. 3,351,495 to Larsen et al. discloses a battery separator having a relatively low pore size and satisfactory electrical resistance characteristics made from a high molecular weight polyolefin having an average molecular weight of at least 300,000, a standard load melt index of substantially zero, and a reduced viscosity of not less than 4. The separator is manufactured by extruding the high molecular weight polyolefin in admixture with an inert filler and a plasticizer and then extracting the plasticizer by the use of a suitable solvent. Other conventional separators for lead-acid and gas recombination batteries contain mostly glass fibers, and in particular, asbestos glass fibers. In view of the recent scrutiny to which asbestos has been subjected, it would be desirable to provide a non-asbestos containing battery separator that exhibits the same or better characteristics than the conventional asbestos-containing separators. Moreover, polymer separators have higher tensile strength than glass mat separators and thus are more conducive to high speed manufacturing, which can significantly reduce production costs.

One problem associated with various batteries is hydration shorts. When a battery is discharged slowly, which occurs for example when the headlights of an automobile are left on for an extended period of time after the engine has been turned off, water is formed which dilutes the electrolyte. As more and more water is formed, a decrease in the specific gravity of the electrolyte occurs, and lead sulfate tends to precipitate onto the battery plates and battery separator (which manifests itself in visible white spots). The precipitated lead sulfate closes the pores in the separator. Although such a battery may be capable of maintaining a charge after being recharged, several of these "slow discharge" episodes will result in shortened battery life. Higher than normal ratios of active material to electrolyte are also a factor in causing hydration problems.

One conventional way of addressing this phenomenon is the addition of sodium sulfate tablets to the electrolyte in a post-manufacturing step. In theory, any water formed during slow battery discharge will cause a portion of the sodium sulfate tablets to dissolve in the electrolyte, thereby maintaining the specific gravity of the electrolyte within the desired range. However, this method is uneconomical from a production standpoint.

It is therefore an object of the present invention to develop a battery separator that will reduce and/or eliminate battery performance problems related to hydration shorts.

SUMMARY OF THE INVENTION

The problems of the prior art have been overcome by the present invention, which incorporates sodium sulfate into the battery separator proper in order to reduce and/or eliminate hydration short problems. The preferred method of adding sodium sulfate directly to the separator is via the use of sodium sulfate-containing silica as a separator filler added during the process of manufacturing the separator. The step of adding sodium sulfate tablets to the electrolyte during the manufacturing process of the battery is therefore eliminated. The present invention is also directed to a battery separator containing a relatively high level of sodium sulfate, and to batteries which incorporate such separators.

DETAILED DESCRIPTION OF THE INVENTION

The polymer that may be used to form the battery separator should be stable with respect to the battery environment in which the separator will be used. Representative examples include polyolefins, halogenated polyolefins, polyamines, polyurethanes, polyethylene imines, polyvinyl chloride, cellulosic materials as well as their copolymers and mixtures thereof. Polyolefins are preferred, with representative polyolefins being polyethylene, high density polyethylene, polypropylene, polybutene, ethylene-propylene copolymers, ethylene-butene copolymers, propylene-butene copolymers, ethylene-propylene-butene copolymers, and an ultra high molecular weight polymer (UHMW) having an weight average molecular weight of at least about three million, preferably at least about four million, as determined according to ASTM D-4020 or DIN-53493 or by the Zero Tensile Strength Test (ZST) as having a value of at least 0.1, preferalby 0.1 to 1 (Newtons/mm$^2$), more preferalby between 0.2 and 0.6 N/mm$^2$. The preferred polyolefin is UHMW polyethylene or UHMW polypropylene.

The filler to be used in the separator of the present invention should have high surface area (BET; about 20 to 950 m$^2$/gm, preferably at least 100 m$^2$/gm), high pore volume (BET: at least about 0.2 cc/gm; preferably at least about 1 cc/gm). The filler may be of any form, preferably particulate or fibrous form or mixture of the two. The size of the ultimate (non-agglomerated) filler material should be very small having an average diameter of from about 0.1 to about 75 microns. The low end of the particle size range refers to single particles while the high end may include agglomerated or fibrous material. The particle size is preferably from about 0.1 to about 50 microns. The filler should be substantially free of large (greater than 100 microns) diameter particulate material (ultimate or agglomerate material).

A processing aid further improves the processability of the composition, i.e., lowers the melt viscosity, or reduces the amount of power input which is required to compound and to fabricate the composition and aids in inducing porosity. The separator of the present invention is formed from an initial composition having a very high content of processing aid therein, such as at least about 60 vol. percent and preferably at least 70 vol. percent based on the initial composition, up to about 90 vol. percent based on the initial composition. The processing aid can be soluble or insoluble in water. Suitable processing aid are plasticizers such as organic esters, including oligomers and hydrocarbon materials. More preferred are water-insoluble processing aids such as tricresyl phosphate, and hydrocarbon materials such as petroleum oil including lubriacting oils and fuel oils and natural oils such as tall oils and linseed oils. Preferred processing aids have solubility parameters close to that of the polymer, preferably in the range of from 7.3 to about 8.4. The processing aid can be extracted from the sheet product by conventional procedures, such as a single stage extraction using a suitable solvent.

One suitable battery separator for use in the present invention is that disclosed in U.S. Pat. No. 3,351,495, the disclosure of which is hereby incorporated by reference. That separator comprises a microporous sheet of polyolefin having a molecular weight of at least 300,000, a standard load melt index of substantially 0 and a reduced viscosity of not less than 4.0. Preferably the battery separator comprises a homogenous mixture of 8 to 93 volume percent of very high molecular weight polyolefin, 0 to 15 volume percent of a plasticizer, and 7 to 92 volume percent filler, including silica. The separator is produced by blending the high molecular weight polyolefin, the inert filler material and the plasticizer, forming the composition into sheet form, and subsequently extracting from the sheet by means of a suitable solvent a portion of the inert filler and plasticizer.

In the manufacturing of precipitated silica, sand and sodium hydroxide are mixed to form sodium silicate or "waterglass". The waterglass is then neutralized with concentrated sulfuric acid, which causes the waterglass to precipitate. A by-product of this reaction is sodium sulfate. Since sodium sulfate is considered a contaminant for most applications, the silica is washed many times to lower the level of sodium sulfate to about 1.5% or less; unwashed precipitated silica can contain from about 7% to about 13% sodium sulfate, usually between about 10–11% sodium sulfate. It is preferably this unwashed silica which is used as the inert filler in the battery separators of the present invention, thereby intrinsicly supplying the necessary sodium sulfate. In the event the silica contains more than the desirable amount of sodium sulfate (i.e., more than about 13%), it can be washed a sufficient number of times to lower the concentration of sodium sulfate to the desired concentration. The preferred concentration of sodium sulfate in the silica for purposes of the present invention is 10–11%, most preferably 10.8%.

In an alternative embodiment, washed precipitated silica is used, and sodium sulfate is added thereto as a separate step, in the suitable amount. This can be accomplished using anhydrous sodium sulfate, or by spraying the silica with a sodium sulfate solution.

Preferably the amount of sodium sulfate-containing silica used in the battery separator formulation is about 20% to about 40% by weight based upon the weight of the polymer, most preferably 30% by weight.

The preferred formulation for a battery separator membrane consisting of 65% processing oil, 10% UHMW polyethylene and 20% precipitated silica filler which includes a minimum of 2.8 weight percent sodium sulfate.

EXAMPLE 1

8.6 pounds of UHMW polyethylene, 34.6 pounds processing oil, 23.8 pounds of silica containing 10 weight percent of sodium sulfate, and 2 pounds of minor ingredients (antioxidant, carbon black pellets, etc.) are blended in a high shear mixer. The resulting dryblend is transferred to a hopper for extrusion. Additional processing oil is added at the feed throat of the extruder so that the total oil content of the extruded black sheet is approximately 63%. The oil in the sheet is extracted with a solvent (hexane) to achieve a porosity of 60% for the finished separator product.

EXAMPLE 2

The separator sheet product of Example 1 and a control identical to the sheet product of Example 1 except that washed silica having a maximum sodium sulfate content of 2% was substituted for the 10.8% sodium sulfate silica were each placed in a battery, the batteries were charged, and were then subjected to a hydration short test. Each battery was discharged slowly, i.e., 20 hours at 3 amps. Each battery was then charged and after 30 days of hydration, the batteries were recharged. The recharged batteries were again discharged slowly (20 hours at 3 amps), and were disassembled for inspection of the separators. The control separator failed the test, as white spots of precipitated lead sulfate were observed on the separator. The separator of the present invention contained no white spots, and passed the test.

What is claimed is:

1. A battery separator comprising a microporous layer formed of a blend of polyolefin, silica and a processing aid, said silica having a sodium sulfate content of about 7–13 %.

2. The battery separator of claim 1 wherein said polyolefin is polyethylene or polypropylene.

3. The battery separator of claim 1, wherein said silica is unwashed silica.

4. The battery separator of claim 1, wherein said sodium sulfate content is 10–11%.

5. The battery separator of claim 1, wherein said sodium sulfate content is 10.8%.

6. The battery separator of claim 1, wherein said blend is homogeneous.

7. A battery comprising a housing, an electrolyte, a series of positive plates and negative plates, and a microporous battery separator around either the positive or negative plates, said battery separator comprising a microporous layer formed of a blend of polyolefin, silica and a processing aid, said silica having a sodium sulfate content of about 7–13 %.

8. The battery of claim 7, wherein said sodium sulfate content is 10–11%.

9. The battery of claim 7, wherein said sodium sulfate content is 10.8%.

10. The battery of claim 7, wherein said polyolefin is polyethylene or polypropylene.

11. The battery of claim 7, wherein said blend is homogeneous.

12. A process for forming a battery separator, comprising:
  a. neutralizing sodium silicate with concentrated sulfuric acid to form precipitated silica having a sodium sulfate content of about 7–13%;
  b. blending a polyolefin with said precipitated silica having said sodium sulfate content and a processing aid;
  c. extruding said blend into sheet-form; and
  d. removing at least a portion of said processing aid.

13. The process of claim 12, wherein said sodium sulfate content is 10–11%.

14. The process of claim 12, wherein said sodium sulfate content is 10.8%.

15. A process for forming a battery separator, comprising:
  a. neutralizing sodium silicate with concentrated sulfuric acid to form precipitated silica;
  b. washing said silica substantially free of said sodium sulfate;
  c. adding sodium sulfate to said silica so that said silica has a sodium sulfate content of about 7–13%;
  d. blending a polyolefin with said silica having said sodium sulfate content of 10–11% and a processing aid;
  e. extruding said blend into sheet form; and
  f. removing at least a portion of said processing aid.

* * * * *